Aug. 26, 1969     O. WEISS     3,462,995
AERIAL PROSPECTING
Filed Sept. 27, 1967     2 Sheets-Sheet 1
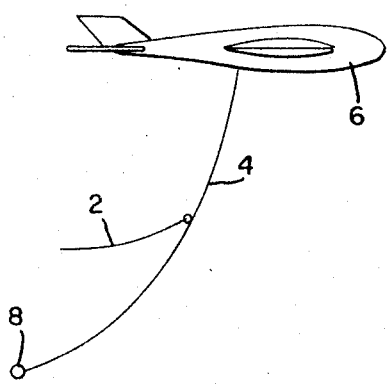
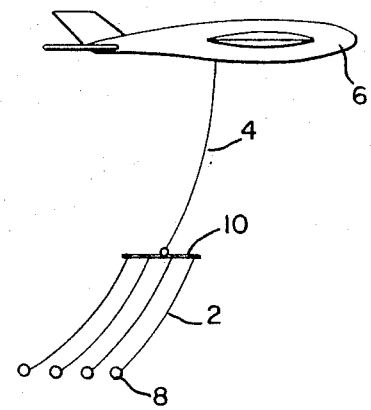
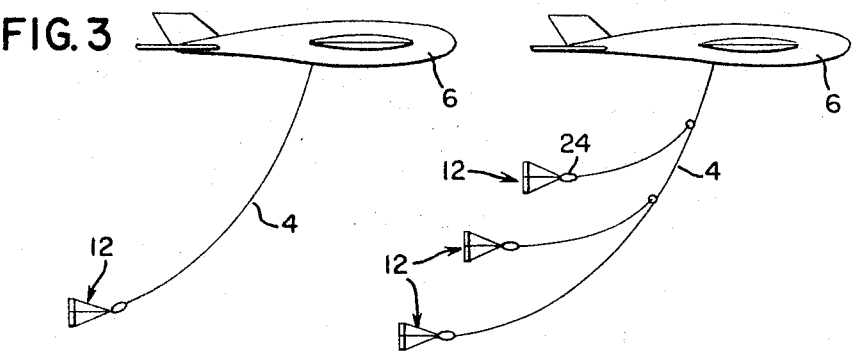
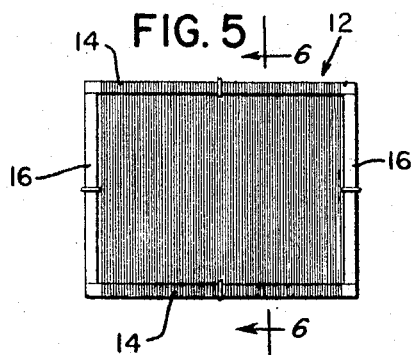
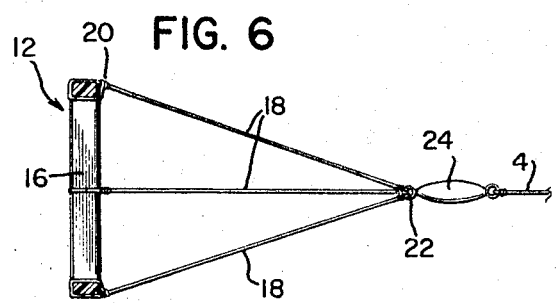
INVENTOR,
OSCAR WEISS
BY *Kemon, Palmer, Stewart & Estabrook*
ATTORNEYS Aug. 26, 1969  O. WEISS  3,462,995

AERIAL PROSPECTING

Filed Sept. 27, 1967  2 Sheets-Sheet 2

INVENTOR,
OSCAR WEISS

BY Kenon, Palmer, Stewart & Estabrook

ATTORNEYS

United States Patent Office 3,462,995
Patented Aug. 26, 1969

3,462,995
AERIAL PROSPECTING
Oscar Weiss, 26 Lisdale, Sea Point, Cape Town,
Cape Province, Republic of South Africa
Filed Sept. 27, 1967, Ser. No. 671,005
Int. Cl. G01n *31/00*
U.S. Cl. 73—28                                                10 Claims

ABSTRACT OF THE DISCLOSURE

Airborne mineral particles are collected with high efficiency, in the course of mineral prospecting by correlation of airborne particle position to particle analysis and concentration, upon threads of nylon or other synthetic fibers towed from aircraft.

BACKGROUND OF THE INVENTION

There is described in U.S. Patent 3,309,518 a method of prospecting an area of the earth's crust for solid metalliferous mineral deposits existing therein by collecting on separate collector surfaces successive samples of airborne particles at a plurality of different positions above the earth's surface, determining the positions at which each of the samples are collected relative to the earth's surface, analyzing each sample for element content, number and size of the particles, and correlating the results of the analysis with determined positions of collection to determine the position of mineral deposits in the earth's crust.

A preferred method for collecting airborne mineral particles described in U.S. 3,309,518 uses membrane filters and the analysis of collected mineral particles is accomplished by dissolving the membrane filters to leave a solution with undissolved mineral particles suspended therein from which the particles may be centrifuged for concentration or alternatively concentrated by filtration. As further explained in the patent, the number of particles captured on membrane filters is of the order of 60 to 100 mineral particles per square inch at short collecting periods of a few minutes.

It has now been found that the small number of particles which collect upon membrane filters and further loss of particles in the course of their concentration by dissolving the filters leaving a suspension of mineral particles for subsequent analysis and identification is tedious and costly. Hence, to render the general methods of aerial prospecting as described in the patent more efficient and to reduce the time and cost of conducting such prospecting, it has been found desirable to have available some improved means for collecting airborne particles and some improved method of concentrating the particles so collected for subsequent analysis and correlation with data on position of collection.

OBJECTS

A principal object of this invention is the provision of improvements in aerial prospecting methods to determine position of mineral deposits in the earth's crust.

Further objects include the provision of:

(1) Information for improving the efficiency of collection of airborne mineral particles for use in aerial prospecting methods as disclosed in U.S. 3,309,518.

(2) New devices for collection of airbrone mineral particles which are of simple construction, involve expendable elements of extremely low cost and which enable concentration of collected particles to be accomplished in a quick and easy manner.

(3) New methods for collecting airborne mineral particles in which the collected particles may be concentrated for analysis without need to use solvents or other liquid solutions or suspensions of particles.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

SUMMARY OF THE INVENTION

These objects are accomplished according to the present invention by a method of aerial prospecting involving airborne collection of mineral particles with subsequent concentration of collected particles followed by analysis of collected particles and correlation of analysis data to geographical position of airborne collection by collecting airborne particles upon threads of synthetic polymer material. The synthetic polymer threads may be passed in the airborne collection procedure as a single strand at a desired height above the ground or, alternatively, the synthetic polymer threads may be stretched across a frame so that a plurality of sections of the thread spaced apart from one another form an open strand configuration which may be towed behind and below an aircraft flying at a suitable height, e.g., 500 to 1000 feet above the ground.

Success of the present invention is due in part to the discovery that fine threads of nylon or equivalent synthetic polymer material, act as highly efficient collectors of mineral particles when passed through air at elevated altitudes and at the high velocities of aircraft. It has been found that the distortion of air flow and the interference of boundary layers in the capturing and retaining of particle aerosols is substantially reduced as compared with membrane collectors. It appears that the strong static electric charges developed by fine threads or fibers of nylon or equivalent synthetic fibers when towed in air at high speeds of modern aircraft contribute to the capturing and retaining of mineral particles necessary to aerial prospecting procedures as aforesaid.

The success of the present invention is further due to the fact that mineral particles collected upon fine threads or fibers of synthetic polymer material may be concentrated and handled for subsequent analysis purposes without recourse to solvents or use of other liquids. This is accomplished by taking the thread upon which particles have been collected and drawing it across a pad or block of particle retentive material which transfers the particles from the thread to the retentive material, concentrating the transferred particles in a thin line upon the retentive material defined by the passage of the dry thread across the pad or block.

In a preferred embodiment of the collection procedures in which one long continuous thread or filament of nylon or similar synthetic fiber is wound between a plurality of frame members, the continuous thread or filament after being towed from an aircraft at suitable elevation to produce collection on the thread of airborne mineral particles, is unwound from the frame and the continuous thread or filament is pulled through a pad under pressure or through a hole made in a block whereby mineral particles upon the thread or filament are removed and retained upon the pad or the surface of the hole in the block.

BRIEF DESCRIPTION OF THE DRAWING

A further understanding of the new methods and devices of this invention may be had by reference to the accompanying drawings in which:

FIGURE 1 is a diagrammatic representation of one form of particle collection device of the invention.

FIGURE 2 is a similar diagrammatic representation of another form of collector device.

FIGURE 3 is an illustration of yet a third form of collector device of the invention.

FIGURE 4 is an illustration of still another form of collector device of the invention.

FIGURE 5 is a plan view of a collector device of the invention involving a plurality of spaced frame members and a synthetic polymer thread wound around said frame members.

FIGURE 6 is a side view of a collector member of the type shown in FIGURE 5 together with tow line and ballast weight forming a collector device of the invention.

Figure 7:
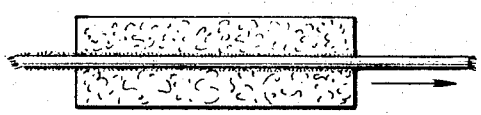
FIGURE 7 is a side view illustrating concentration of collected mineral particles from a synthetic fiber thread in accordance with the invention.
Figure 8:
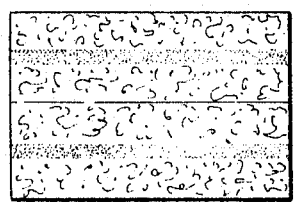
FIGURE 8 is a view of the mineral particle transfer pad shown in FIGURE 7 illustrating concentration of mineral particles upon the transfer pad.
Figure 9:
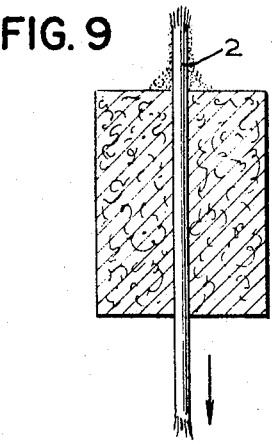
FIGURE 9 is an enlarged side sectional view showing the concentration of particles from a collector thread upon a block of particle retentive material.
Figure 10:
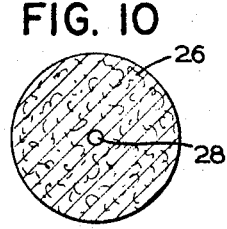
FIGURE 10 is a top view of a mineral particle concentrating block of the type shown in FIGURE 9.
Figure 11:
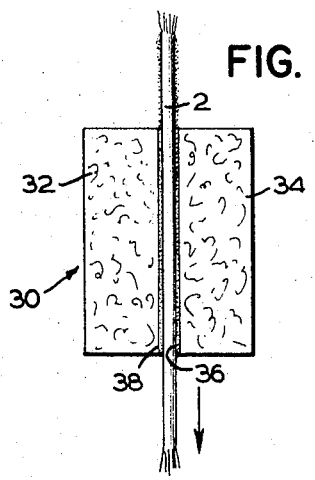
FIGURE 11 is a side sectional view of a modified form of particle concentration device similar to that shown in FIGURE 9.
Figure 12:
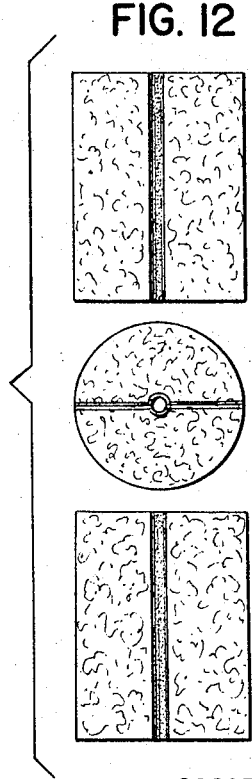
FIGURE 12 is a top expanded view of a particle concentration device of the type shown in FIGURE 11 illustrating how mineral particles are transferred and concentrated from a collector thread onto the transfer device in accordance with the invention.

Referring in more detail to the drawings, one method of collecting particles in accordance with the invention involves streaming a single nylon thread 2 from a tow line 4 suspended from an aircraft 6 with a ballast weight 8 attached to the end of the tow line 4 to cause the tow line to stream below and rearwardly of the aircraft 6.

In the modification shown in FIGURE 2, the tow line 4 depending from the aircraft 6 carries at its lower end a bar or rod 10 to which are fixed a plurality of single collector threads 2 upon the free ends of which are fastened small ballast weights 8 which will cause the single threads 2 to stream behind the bar or rod 10 as the aircraft flies at suitable height above ground.

In the modified form of collection device shown in FIGURE 3, the tow line 4 suspended from the aircraft 6 carries at the free end a collector frame 12. Such a collector frame may be of construction as shown in FIGURE 5 including a plurality of frame members 14 and spacer members 16. Around the frame members 14 is wound a nylon or equivalent synthetic fiber thread in staggered manner so that a plurality of spaced apart thread sections stretch across the frame members 14 forming an open strand collector element.

As shown in FIGURE 6, a collector frame as illustrated in FIGURE 5 may be fastened by a plurality of tie lines 18 of approximately equal length fastened at one end 20 to the collector frame and at the other end 22 to the ballast weight 24 which is fastened to the tow line 4.

In the further form of collection device shown in FIGURE 4, the aircraft 6 carries a tow line 4 to which a plurality of collector frames 12 are fastened.

A method of transferring particles from synthetic fiber threads after airborne collection and concentration of the particles for further analysis may be accomplished in a unique manner in accordance with the invention as illustrated in FIGURES 7–12. With reference to FIGURES 7 and 8, this transfer and concentration of particles may be accomplished using a folded pad of any suitable material which is free of ingredients or contamination by trace elements which are sought to be analyzed. By way of example, one may use a nylon microweb reinforced Millipore pad. As an alternative, one could use a felt or pad of alpha-cellulose fibers, a nonwoven fabric formed of polyolefin fibers or any other suitable sheet, film or web material which would be free of content of trace elements sought to be determined by the operations and which would have a slightly abrasive or wiping effect upon the collector thread and a retentive characteristic for mineral particles to be transferred from the thread to the pad. By way of illustration, a pad as illustrated in FIGURE 8 can be one centimeter square with a thickness of about 0.1 to 5 millimeters. Such a pad would be folded approximately in half and the collector thread from which particles are to be transferred and concentrated would be as shown in FIGURE 7 between the overlapped portions of the folded pad. Finger pressure may be used to compress the two halves of the folded pad against the thread or, for more precision, screw thread operated calibers or the like may be employed for this purpose. A single pass of the thread between the folded sections of the pad may be used although a plurality of passes may be employed to ensure full transfer of collected mineral particles from the thread to the pad.

In the case where a wound frame collector device of the type illustrated in FIGURE 5 is employed, the transfer and concentration of particles will be accomplished by first unwinding the collector thread from the frame and then pulling the thread through the pad. It has been found that in such an operation, the collected microscopic mineral particles will be removed from the thread and be retained on the pad substantially along a line defined by the direction of travel of the thread across the pad (see FIGURE 8). The length of the streak or lines of concentrated particles will vary with the width of the pad or other collecting unit and the width of the streak or lines of the same order as the diameter of the collector thread.

After this transfer and concentration step, particles can be analyzed in various ways such as described in the aforesaid patent U.S. 3,309,518 or by any other suitable method of analysis known to those versed in the techniques of micro-analysis.

Instead of using flat collector pads, webs or the like, one may employ blocks, cylinders or the like as illustrated by FIGURE 9–12. As shown in FIGURES 9 and 10, a collector unit may consist of a block or cylinder 26, through which there extends a central hole 28 of size approximating the size of the collector thread 2. With this form of collector device, the thread will be passed through the hole 26 while the block is compressed and as this is done, particles collected by the thread will be transferred to the collector block concentrating primarily at the inlet end of the hole. For subsequent analysis, one then can cut out from the block 26 that portion of the blocks surrounding the inlet end of the hole 28 and subject this to suitable analysis.

An alternative arrangement for transfer and concentration of the mineral particles from the collector thread is illustrated in FIGURES 11 and 12. Here, the collector unit 30 may comprise a split block or cylinder formed of one section 32 and a second section 34 suitably shaped to present or define a central channel or hole 36. A thin lining 38 free of trace elements made of suitable material as already described can be placed between the split sections 32 and 34 and between such a lining the thread 2 will be drawn while the block is compressed. As illustrated in FIGURE 12, the passage of the thread over the lining within the collector device 30 will then result in a transfer of particles from the collector thread to the lining in a concentrated line defined by the length of travel of the thread.

EXAMPLE

To prepare for collection of airborne mineral particles according to the invention, a square frame approximately 30 centimeters on each side made of nylon rods was provided and 600 feet of nylon thread about 0.2 millimeter in diameter was wound upon the frame in a manner as illustrated in FIGURE 5. Sections of the nylon cord about 4 meters in length were tied to each corner of the nylon rod frame and the free ends of these lines were then tied together and in turn tied to a ballast weight of about 4 kilograms. The ballast weight in turn was tied to a towing line of nylon rope about 200 meters in length. This tow rope was wound on a drum coupled to a winch by a clutch and carried in a compartment within an aircraft. While the aircraft was flying at an altitude in the range of about 200–400 meters, the nylon rod frame with nylon thread wound thereupon and the ballast weight were dropped free-wheeling from the aircraft by declutching the drum. After towing the frame for approximately five minutes, the drum was clutched to the high speed winch and wound up. At the same time, another frame on another winding drum was dropped from the aircraft and this process using alternate drums and collector frames was repeated. Each collector frame was identified as to position upon a predetermined flight pattern or grid to permit subsequent correlation of particle collection results to position of collection upon the pattern or grid.

The collector frames when towed from the aircraft as described, rotate at the end of the towing line and such rotation increases the collection efficiency of the device for airborne mineral particles. Each frame is suitably numbered or otherwise identified and its exposure time and height is correlated with the corresponding position of the aircraft in suitable manner, e.g., as described in the aforesaid U.S. Patent 3,309,518.

DISCUSSION OF DETAILS

Fine threads are the best collectors for the purposes of the invention to collect airborne microscopic mineral particles at high velocities from aircraft. Such threads may be of spun staple fibers or continuous monofilaments of suitable size. Thinner threads are advantageously used since these provide higher efficiency of collection. The lower limit of the thread size is set by tensile strength of the thread as tensile strength may be controlled by force of the air upon the thread during towing behind an aircraft or force which may be subjected to the thread during the transfer and concentration procedures as described previously. Threads having a size of the order of 0.01 millimeter to 1 millimeter in diameter have been found satisfactory.

Nylon constitutes a suitable synthetic polymer material from which to form fibers, monofilaments or the like to provide collector elements as comprehended by the invention. However, fibers, filaments or the like of any other suitable synthetic polymer material which would be free of contamination from trace elements sought to be detected and analyzed in accordance with the invention may be used. Additional examples of useable fibers include polyester fibers, acrylic fibers, modacrylic fibers, polyolefin fibers and the like. The collection efficiency of the threads or fibers appears, at least in part, to be due to creation of strong static electric charges on the fibers when towed in air at high speeds. Accordingly, use of synthetic polymer materials which provide strong static electric charges in this manner are advantageous.

The analysis with individual particles and of concentrated particles for the identification of their constituent element and for their size distribution can be tedious and costly. For this reason, it is advantageous to eliminate such collected samples of microscopic mineral particles which contain no metallic elements of economic interest. To achieve this, the threads or similar collector elements of the invention are calcined or otherwise ignited or combusted and the very small residues which result contain the mineralized aerosols which can then be quickly analyzed by various techniques of spectrometry or the like and the metallic elements present therein can be detected and determined quantitatively. If there are no trace elements present in a collector sample, then no further detailed analysis is necessary. In this manner, blank samples can be quickly eliminated.

By way of example, a procedure of analysis would involve division of each collector fiber sample into one-half units. One such unit would be calcined and the residue tested for metallic elements by suitable methods of microanalysis. The other half of the fiber sample could then be used for checking or for detailed analysis where the preliminary microanalysis test indicated this to be desirable or necessary. The quantitative or semi-quantitative values of concentration of metallic elements would then be plotted upon grids or contour maps or as curves after correlating such values with the position of the aircraft.

The shape of such contours and the relative intensity of respective elements would then be used in accordance with the techniques disclosed in U.S. 3,309,518 to locate mineral deposits in the earth's surface, e.g., surface exposures of mineralized rock. If such identifications show sufficient results, the process can be repeated to collect aerosol mineral samples simultaneously at different heights or altitudes. This can be done by clipping a number of collector frames onto loops or other suitable fixtures, to a towing line at desired intervals (see FIGURE 4). In this manner, it is possible to draw contours at various heights above the earth's surface and to draw vertical sections through such contours to locate the source of mineralized aerosol.

CONCLUSION

New improvements in method of aerial prospecting for mineral deposits in the earth's crust have been described above. These improvements involve the use of threads or similar thread-like elements which are drawn through the air at suitable height above the ground from aircraft following which particles collected by the threads are transferred and concentrated by the simple operation of drawing the threads across a small pad, block or the like. In this manner, concentration of mineral particles for subsequent analysis can be accomplished without recourse to the use of solvents or other liquid operations which, in the past, have lowered the efficiency and increased time and cost in these aerial prospecting operations.

The embodiments of the invention in which an exclusive property or right is claimed are defined as follows:

1. In the method of aerial prospecting involving airborne collection of mineral particles, subsequent concentration of the collected particles, analysis of the collected particles, and correlation of the analysis data to geographical position of airborne collection, the improvement which comprises collecting the particles upon a continuous thread of synthetic polymer material.

2. A method as claimed in claim 1 wherein said synthetic polymer material is nylon.

3. A method as claimed in claim 1 wherein the airborne collection is made by streaming a single nylon thread from an aircraft.

4. A method as claimed in claim 1 wherein the airborne collection is made by towing behind and below an aircraft frame across which is stretched a plurality of sections of a thread made of synthetic polymer fiber, said sections being spaced apart from one another.

5. A method as claimed in claim 4 wherein the thread subsequent to said towing is unwound from said frame particles thereon are concentrated by drawing the unwound thread across the surface of a body of particle retentive material.

6. A method as claimed in claim 1 wherein the thread upon which particles have been collected is drawn across a pad or block of particle retentive material to transfer the particles to said retentive material and effect a concentration of said particles.

7. A device for collection of airborne mineral particles comprising a tow line, a ballast weight fastened to the towline and a collector unit fastened to the tow line, said collector unit comprising a plurality of spaced frame members and a synthetic polymer thread wound around said frame members presenting a plurality of spaced apart thread sections stretched between the frame members.

8. A device as claimed in claim 7 wherein a plurality of tie lines hold said frame member to a single tow line.

9. A device as claimed in claim 7 wherein a plurality of said collector units are carried by a single tow line.

10. A device as claimed in claim 7 wherein said thread is made of nylon and is about 0.01 to 1 mm. in diameter.

References Cited

UNITED STATES PATENTS

| | | | |
|---|---|---|---|
| 2,468,021 | 4/1949 | Black | 73—170 |
| 2,645,941 | 7/1953 | Reid | 73—421 |
| 3,059,470 | 10/1962 | Baldwin et al. | 73—28 X |
| 3,309,518 | 3/1967 | Weiss | 73—421 X |
| 3,395,516 | 8/1968 | Schecter et al. | 73—170 X |

LOUIS R. PRINCE, Primary Examiner

JOSEPH W. ROSKOS, Assistant Examiner

U.S. Cl. X.R.

73—421